(12) United States Patent
Mori (10) Patent No.: US 12,459,159 B2
(45) Date of Patent: Nov. 4, 2025

(54) METHOD FOR PRODUCING COLORED WOOD

(71) Applicant: Panasonic Intellectual Property Management Co., Ltd., Osaka (JP)

(72) Inventor: Kenji Mori, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 18/273,570

(22) PCT Filed: Jan. 24, 2022

(86) PCT No.: PCT/JP2022/002351
§ 371 (c)(1),
(2) Date: Jul. 21, 2023

(87) PCT Pub. No.: WO2022/163565
PCT Pub. Date: Aug. 4, 2022

(65) Prior Publication Data
US 2024/0091981 A1    Mar. 21, 2024

(30) Foreign Application Priority Data
Jan. 26, 2021  (JP) ................. 2021-010556

(51) Int. Cl.
*B27K 5/02*   (2006.01)
*B27K 3/36*   (2006.01)

(52) U.S. Cl.
CPC . *B27K 5/02* (2013.01); *B27K 3/36* (2013.01)

(58) Field of Classification Search
CPC . B27K 3/343; B27K 3/50; B27K 5/02; B27K 5/04; B27K 3/0214
See application file for complete search history.

(56) References Cited

U.S. PATENT DOCUMENTS 933,436 A  *  9/1909  Hall ................. B27K 5/02
                                              8/402
4,376,141 A  *  3/1983  Maddox ............ B27K 3/52
                                              8/402
(Continued)

FOREIGN PATENT DOCUMENTS

CN    102837344 A    12/2012
JP    50-125008 A    10/1975
(Continued)

OTHER PUBLICATIONS

International Search Report for corresponding Application No. PCT/JP2022/002351, mailed Apr. 5, 2022.
(Continued)

*Primary Examiner* — Alex A Rolland
(74) *Attorney, Agent, or Firm* — Renner, Otto, Boisselle & Sklar, LLP (57) ABSTRACT

Provided is a method for producing colored wood, the method including: a step of impregnating a block of wood with an organic acid aqueous solution containing an organic acid; and a step of performing steam treatment at high temperature and high pressure on the block of wood in a wet state of being impregnated with the organic acid aqueous solution while keeping the block of wood in the wet state. In the steam treatment, the temperature is 110° C. or more and 160° C. or less and the pressure is a saturated steam pressure at the temperature.

11 Claims, 5 Drawing Sheets

(56) References Cited

U.S. PATENT DOCUMENTS

| | | | |
|---|---|---|---|
| 4,752,297 A | 6/1988 | Leach | |
| 2012/0160843 A1* | 6/2012 | Felty, Jr. .............. | B27K 5/0055 |
| | | | 219/756 |

FOREIGN PATENT DOCUMENTS

| | | | |
|---|---|---|---|
| JP | 62-160202 A | | 7/1987 |
| JP | H01-255502 A1 | | 10/1989 |
| JP | H01255502 A | * | 10/1989 |
| JP | H08-155909 A | | 6/1996 |
| JP | 2012-240371 A | | 12/2012 |
| JP | 2013-095037 A | | 5/2013 |
| JP | 2017140757 A | * | 8/2017 |
| JP | 2018-051837 A | | 4/2018 |
| JP | 2018-161802 A | | 10/2018 |

OTHER PUBLICATIONS

Written Opinion for corresponding Application No. PCT/JP2022/002351, mailed Apr. 5, 2022.

Kensuke Hanata et al., "Resistances of Plato heat-treated wood against decay and termite", Wood Preservation, Japan Wood Protection Association, 2006, vol. 32, No. 1, p. 13-19; w/ English Abstract.

Extended European Search for corresponding EP Application No. 22745786.8 issued Jun. 25, 2024.

* cited by examiner

| MALTOSE | — | FRUCTOSE | — | FRUCTOSE | FRUCTOSE | FRUCTOSE | XYLOSE | XYLOSE |
|---|---|---|---|---|---|---|---|---|
| CITRIC ACID | SUCCINIC ACID | MALIC ACID | XYLOSE | CITRIC ACID | SUCCINIC ACID | MALIC ACID | SUCCINIC ACID | MALIC ACID |
| — | — | — | — | WATER ONLY | MALTOSE CITRIC ACID | MALTOSE SUCCINIC ACID | MALTOSE MALIC ACID | XYLOSE CITRIC ACID |

FIG. 7

METHOD FOR PRODUCING COLORED WOOD

TECHNICAL FIELD

The present disclosure relates to a method for producing colored wood.

BACKGROUND ART

Wood is conventionally subjected to heat treatment to darken the color, thereby bringing out the original grain, knots, and the like of the wood and enhancing intrinsic properties of the wood. Patent Literature 1 discloses a treatment method for coloring wood brown. Specifically, wood is colored brown by compressing the wood while supplying steam into a high-temperature and high-pressure container, and then by subjecting the wood to oxidization and a composition change while supplying steam having a higher temperature.

Patent Literature 2 discloses that in a method for producing a toned wood material by heating the wood material, an aqueous solution of a polyvalent carboxylic acid is adhered to the surface of the wood material before the wood material is heated. Specifically, an aqueous solution of a polyvalent carboxylic acid is first applied to one surface of the wood material having a plate shape, and the wood material is subjected to natural drying. Then, the wood material is set in a hot disk press, the hot disk is heated to 200° C., and the wood material is subjected to heating and compressing treatment for 30 seconds to obtain a toned wood material. In the heating and compressing treatment of Patent Literature 2, since the treatment does not need to be performed in a steam atmosphere, a large and complicated treatment device having a sealed container is unnecessary.

CITATION LIST

Patent Literature

Patent Literature 1: Japanese Unexamined Patent Application Publication No. H8-155909
Patent Literature 2: Japanese Unexamined Patent Application Publication No. 2013-95037

SUMMARY OF INVENTION

Here, in recent years, there has been a demand for the coloring of thicker wood used for furniture and solid flooring. However, when a block of wood having a thickness of 1 cm or more is colored using the treatment method in Patent Literature 1, there is an issue that the surface of the wood is excessively dried when the pressure is lowered from a high pressure to atmospheric pressure in the final stage of heat treatment, resulting in cracking in the wood.

In Patent Literature 2, coloring is performed using a dry treatment without performing heating in a steam atmosphere. In other words, in Patent Literature 2, after the wood material is dried and water is removed, the wood material is colored using heat and a polyvalent carboxylic acid. Therefore, there is an issue that the wood tends to be unevenly colored and further has a dull coloration.

The present disclosure has been made in consideration of such issues as described above, which are inherent in the related art. An object of the present disclosure is to provide a method for producing colored wood, the method being capable of reducing cracking in wood during coloring to a greater extent while also coloring the wood more vividly than in a dry treatment, and being further capable of relaxing the coloring treatment conditions.

In response to the above issues, a method for producing colored wood according to a first aspect of the present disclosure includes a step of impregnating a block of wood with an organic acid aqueous solution containing an organic acid, and a step of performing steam treatment at high temperature and high pressure on the block of wood in a wet state of being impregnated with the organic acid aqueous solution while keeping the block of wood in the wet state. In the steam treatment, the temperature is 110° C. or more and 160° C. or less and the pressure is a saturated steam pressure at the temperature.

A method for producing colored wood according to a second aspect of the present disclosure includes a step of impregnating a block of wood with an organic acid aqueous solution containing an organic acid, a step of performing steam treatment at high temperature and high pressure on the block of wood in a wet state of being impregnated with the organic acid aqueous solution while keeping the block of wood in the wet state, a step of drying the block of wood that has been subjected to the steam treatment, and a step of heating the block of wood under an inert atmosphere after drying the block of wood that has been subjected to the steam treatment. In the steam treatment, the temperature is 110° C. or more and 160° C. or less and the pressure is a saturated steam pressure at the temperature.

DESCRIPTION OF EMBODIMENTS

Referring to the drawings, a description is given below of a method for producing colored wood according to embodiments. Note that dimensional ratios in the drawings are exaggerated for convenience of the description and are sometimes different from actual ratios.

First Embodiment

A method for producing colored wood according to the present embodiment includes a step of impregnating a block of wood with an organic acid aqueous solution containing an organic acid, and a step of performing steam treatment at high temperature and high pressure on the block of wood in a wet state of being impregnated with the organic acid aqueous solution while keeping the block of wood in the wet state.

Figure 1:
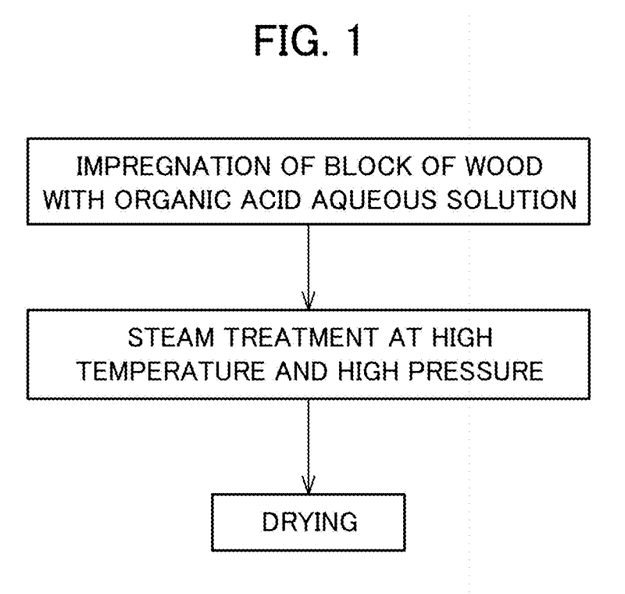
FIG. 1 is an explanatory diagram illustrating an example of a method for producing colored wood according to an embodiment.

FIG. 1 illustrates a flow of the method for producing colored wood according to the present embodiment. In the production method according to the present embodiment, as a first step, a block of wood is impregnated with an organic acid aqueous solution containing an organic acid. It is sufficient that the wood has a block shape, and an example is wood processed into a plate shape. Note that the thickness of the wood in the plate shape is not particularly limited and may be 10 mm or more and 40 mm or less, for example.

Examples of wood include wood of various tree species used for building materials such as floors, walls, and ceilings, fixture members, furniture, crafts, and the like. The tree species of the wood are not particularly limited, and for example, at least one selected from the group consisting of Japanese cedar, Japanese larch, Douglas fir, rubber tree, birch, beech, oak, teak, hard maple, cherry, walnut, white ash, mahogany, and yellow birch can be used. The wood described above has a high-grade appearance and high design characteristics, and thus by coloring them, they can be suitably used for building materials, fixture members, furniture, and crafts.

In addition, fast-growing trees that grow to large-diameter trees in a short period of time mainly in Japan and Southeast Asia can also be used as wood. Specifically, as the wood, at least one selected from the group consisting of chinaberry, Nepali hog-plum, Japanese alder, tulip tree, eucalyptus, poplar, acacia mangium, and falcata can be used. Fast-growing trees are tree species that can be sufficiently supplied in afforestation because they grow quickly and are relatively inexpensive. Here, fast-growing trees have a wide portion where the annual ring width is large and a large curvature of the annual rings, and thus exhibit anisotropy in dimensional changes. Thus, when fast-growing trees are dried, a large local shrinkage stress is generated and dry cracking is likely to occur. However, because organic acids and saccharides have a dimensional stabilizing effect as described below, they can be impregnated into the interior of fast-growing trees to suppress shrinkage. Therefore, fast-growing trees can also be suitably used as wood in the present embodiment.

Note that the wood may be in a raw state having a high moisture content or in a dry state having a low moisture content. Even when the moisture content of wood is high, water in vessels can be replaced with an organic acid aqueous solution, and thus the inside of the wood can be impregnated with an organic acid aqueous solution and colored. Note that artificially dried wood (KD wood) that is artificially dried in a drying kiln or the like to reduce the moisture content may be used as wood. In this case, the moisture content of the KD wood is preferably 7% to 25%. Note that the moisture content of wood can be measured in accordance with the Japanese Industrial Standard JIS Z2101 (Methods of test for woods).

Here, blocks of wood in a raw state (green wood) may crack or discolor due to drying when stored at room temperature. In addition, unprocessed wood to be sawed into green wood may also crack or discolor due to drying, and thus it is imported from winter to spring when the temperature is low. Furthermore, after being sawed into green wood, it is essential for the green wood to be stored in a refrigerator or freezer to prevent cracking and discoloration. In addition, since blocks of wood are sawed from unprocessed wood having a substantially circular cross section, the yield rate decreases. Furthermore, when unprocessed wood is imported from overseas and sawed into blocks of wood, discarded parts are generated during sawing, and this means that unprocessed wood is transported with the discarded parts included when imported. Therefore, transportation and storage costs tend to be higher when green wood and unprocessed wood are transported over long distances.

In contrast, dried wood (KD wood) has a low risk of cracking and discoloration because it is in a dry state, although a step to dry the green wood is required. Furthermore, KD wood can be stored at room temperature. In this way, KD wood can reduce transportation and storage costs.

Note that when the place where unprocessed wood is cut is close to the place where the production method according to the present embodiment is performed, it is not necessary to transport the unprocessed wood for a long distance. Thus, in this case, it is preferable to use green wood as wood without using KD wood, which requires a drying step.

An organic acid aqueous solution impregnated into the above wood can be prepared by dissolving an organic acid in water. As the organic acid, as will be described below, an organic compound can be used that causes wood impregnated with the organic acid aqueous solution to be colored through steam treatment at high temperature and high pressure. Specifically, the organic acid is preferably at least one selected from the group consisting of a carboxylic acid, a sulfonic acid, and a sulfinic acid.

Note that the organic acid is preferably a carboxylic acid, and more preferably a divalent or higher carboxylic acid. When wood impregnated with a carboxylic acid is brought into contact with high temperature and high pressure steam, cellulose, hemicellulose, and lignin, which are components of wood, tend to change in quality, and this makes it possible to further promote the coloration of wood.

The carboxylic acid is preferably at least one selected from the group consisting of citric acid, tartaric acid, malic acid, succinic acid, oxalic acid, adipic acid, malonic acid, phthalic acid, sebacic acid, maleic acid, fumaric acid, itaconic acid, glutaric acid (1,5-pentanedioic acid), gluconic acid, glutaconic acid, and pentenedioic acid. The carboxylic acid is more preferably at least one selected from the group consisting of citric acid, malic acid, and succinic acid. By using citric acid, malic acid, or succinic acid, colored wood having vivid redness can be easily obtained. Moreover, these carboxylic acids can be obtained from naturally derived materials, and it becomes possible to reduce environmental load.

In an organic acid aqueous solution, the amount of an organic acid is preferably 3% to 30% by mass, more preferably 3% to 20% by mass, and even more preferably 3% to 10% by mass. Since the amount of the organic acid in the organic acid aqueous solution is within these ranges, the dimensional stabilizing effect due to the organic acid can be obtained as described below while the wood is also colored through steam treatment.

The organic acid aqueous solution preferably further contains a saccharide. When the organic acid aqueous solution contains both an organic acid and a saccharide, the dimensional stability of the wood can be enhanced while coloration of the wood is promoted. Specifically, by impregnating the wood with an organic acid aqueous solution containing both an organic acid and a saccharide and then performing steam treatment, the effect due to the organic acid can promote darkening of the wood and increase redness. In addition, the saccharide can be filled in the micropores in the cell walls of the wood instead of water molecules, and remains in the micropores without evaporating even during drying. Since a saccharide can keep the cell walls in a swollen state, what is known as the "bulk effect" can suppress shrinkage of the obtained colored wood.

At least one saccharide selected from the group consisting of a monosaccharide, a disaccharide, an oligosaccharide, and a polysaccharide can be used. Examples of the monosaccharide include fructose, xylose, ribose, arabinose, rhamnose, xylulose, and deoxyribose. Examples of the disaccharide include sucrose, maltose, trehalose, turanose, lactulose, maltulose, palatinose, gentiobiulose, melibiulose, galactosucrose, rutinulose, and planteobiose. Examples of the oligosaccharide include a fructooligosaccharide, a galactooligosaccharide, a mannan oligosaccharide, and stachyose. Examples of the polysaccharide include starch, agarose, an alginic acid, glucomannan, inulin, chitin, chitosan, a hyaluronic acid, glycogen, and cellulose.

Here, the saccharide is preferably at least one selected from the group consisting of fructose, maltose, xylose, and sucrose. These saccharides are readily available and in addition, together with an organic acid, make it possible to enhance dimensional stability of colored wood.

In an organic acid aqueous solution, the amount of a saccharide is preferably 3% to 30% by mass, more preferably 3% to 20% by mass, and even more preferably 3% to 10% by mass. When the amount of a saccharide in an organic acid aqueous solution is within these ranges, the effect of the dimensional stabilization of colored wood due to the saccharide can be obtained.

Note that since organic acids and saccharides are highly soluble in water, organic acid aqueous solutions may not contain an organic solvent. Moreover, when an organic acid aqueous solution does not contain an organic solvent, the environmental load can be reduced and the safety to the human body can be enhanced.

The method for impregnating a block of wood with an organic acid aqueous solution is not particularly limited. For example, wood can be impregnated with an organic acid aqueous solution by immersing it in the organic acid aqueous solution and leaving it to stand. Note that to speed up the impregnation of wood with an organic acid aqueous solution, it is preferable to put wood into a pressure-resistant container filled with an organic acid aqueous solution and to pressurize it. In this case, the pressure for pressurizing is not particularly limited and is preferably set to 0.3 to 10.0 MPa, for example.

When wood is impregnated with an organic acid aqueous solution, the temperature of the organic acid aqueous solution is not particularly limited and is preferably set to 80° C. or less, for example. The temperature of the organic acid aqueous solution can also be room temperature.

In order to speed up the impregnation of an organic acid aqueous solution into wood, the wood may be immersed in the organic acid aqueous solution after the air inside the wood is removed by depressurizing the wood in a pressure-resistant container. This makes it easier for the organic acid aqueous solution to penetrate into the inside of vessels in the wood, and thus the wood can be impregnated quickly with the organic acid aqueous solution.

When impregnating a block of wood with an organic acid aqueous solution, it is preferable that the organic acid aqueous solution impregnate the whole wood, that is, to the center of the wood. In this way, it is possible for the wood to be colored to the center of the wood by the action of the organic acid. However, it is not always necessary to impregnate the center of the wood with an organic acid aqueous solution, and it is sufficient that at least the part of the wood to be colored be impregnated with the organic acid aqueous solution.

In the production method according to the present embodiment, as a second step, wood in the wet state of being impregnated with the organic acid aqueous solution is subjected to steam treatment at high temperature and high pressure while being kept in the wet state. Specifically, firstly, the wood impregnated with the organic acid aqueous solution is put into, for example, a pressure-resistant container. At this time, it is preferable not to dry the wood impregnated with the organic acid aqueous solution, and to put it into the pressure-resistant container while keeping the wet state thereof. When the wood impregnated with the organic acid aqueous solution is dried and then treated with steam, the wood can be colored but it may become dull or lack vividness. Therefore, it is preferable to perform steam treatment on the wood impregnated with the organic acid aqueous solution while keeping the wood in the wet state.

Then, by introducing steam into the pressure-resistant container while heating the inside thereof, heat treatment is performed on the wood impregnated with the organic acid aqueous solution under a steam atmosphere. In this case, the heating temperature of the wood is preferably 110° C. or more to 160° C. or less, and the pressure on the wood is preferably the saturated steam pressure at this temperature. When the wood impregnated with an organic acid aqueous solution is heated under such a high-temperature and high-pressure steam atmosphere, cellulose, hemicellulose, and lignin, which are components of the wood, are hydrolyzed by the organic acid. This makes the wood redder and darker.

Note that the heating temperature of the wood is preferably 110° C. or more and 160° C. or less, more preferably 110° C. or more and 150° C. or less, and even more preferably 110° C. or more and 140° C. or less. When wood impregnated with an organic acid is heated at a high temperature exceeding 160° C., the deterioration of the wood may progress and the strength and durability may decrease. In addition, when the wood is heated at a low temperature below 110° C., it is difficult for the hydrolysis reaction due to the organic acid to progress and the darkening may be insufficient. Therefore, the heating temperature of the wood is preferably in the above temperature ranges.

The time for steam treatment performed on the wood impregnated with an organic acid aqueous solution is not particularly limited. For example, increasing the temperature of the steam treatment promotes the darkening of the wood. Furthermore, increasing the concentration of the organic acid in the aqueous organic acid aqueous solution also promotes the darkening of the wood. The degree of darkening also varies depending on the species of wood or the type of organic acid. Therefore, it is preferable to adjust the time of the steam treatment according to the temperature of the steam treatment, the concentration of the organic acid contained in the organic acid aqueous solution, the species of wood, and the type of organic acid. For example, the time of the steam treatment for wood impregnated with the organic acid aqueous solution can be 0.5 hours or more.

After such steam treatment, the inside of the pressure-resistant container is lowered from the high pressure state to the atmospheric pressure, and the wood is taken out from the pressure-resistant container.

In the production method according to the present embodiment, as a third step, the wood that has been subjected to steam treatment is dried to remove excess moisture inside the wood. Drying conditions are not particularly limited, and natural drying may be used, for example. The wood may also be dried by heating, for example, at a temperature of 60° C. or lower. Moreover, the drying atmosphere is not particularly limited and, for example, drying may be performed in air. In addition, moisture inside the wood may be removed by gradually reducing the humidity in the drying atmosphere. Then, the colored wood can be obtained by going through this drying step.

Here, since organic acids and saccharide stay in minute spaces inside the wood, shrinkage of the wood during drying can be suppressed and dimensional stability can be enhanced. Thus, even when wood that has been subjected to steam treatment is dried as described above, deformation and cracking of the wood can be suppressed.

Thus, the method for producing colored wood according to the present embodiment includes a step of impregnating a block of wood with an organic acid aqueous solution containing an organic acid, and a step of performing a steam treatment at high temperature and high pressure on the block of wood in a wet state of being impregnated with the organic acid aqueous solution while keeping the block of wood in the wet state. The temperature in the steam treatment is 110° C. or more and 160° C. or less, and the pressure is the saturated steam pressure at this temperature.

In the production method according to the present embodiment, the organic acid and the steam treatment promote hydrolysis of composition components of the wood, and the wood is darkened. Hence, this requires less heat (lower temperature) treatment to achieve the same level of coloring as the conventional treatment method, and thus the heat treatment conditions for the wood can be relaxed.

Furthermore, since an organic acid has the effect of stabilizing the dimensions of the wood, the occurrence of cracking, deformation, and shrinkage during drying can be reduced compared to a conventional method even with the same degree of coloring (hydrolysis level). Moreover, the dimensional stabilizing effect of an organic acid can suppress the occurrence of defects during application processes after the steam treatment. In particular, in a process of performing steam treatment on wood and producing dry wood, the occurrence of defects such as cracking can be suppressed.

Note that when wood is colored in a dry method without heating in a steam atmosphere as in Patent Literature 2, the obtained wood has a dull color. When green wood is heated in a steam atmosphere, it can be colored vividly, but when dried wood is impregnated only with water and heated, the obtained wood has a dull color. In contrast, in the production method according to the present embodiment, since wood is impregnated with an organic acid aqueous solution and heated, it can be colored vividly due to the effect of the organic acid similar to when green wood is subjected to heat treatment.

The method for producing colored wood according to the present embodiment preferably further includes a step of drying the block of wood that has been subjected to steam treatment. By drying the wood that has been subjected to steam treatment to remove excess moisture, the wood can be suitably used for various applications such as building materials, fixture members, furniture, and crafts.

Note that the colored wood of the present embodiment may be further impregnated with a dimension stabilizing resin to enhance the dimensional stability. Specifically, before drying the block of wood that has been subjected to steam treatment, the wood may be impregnated with a dimension stabilizing resin. As such a dimension stabilizing resin, at least one selected from the group consisting of a glycol-based resin, a glyoxal resin, a melamine resin, a urea resin, and a phenolic resin may be used. However, since organic acids and saccharides have dimension stabilizing effects by themselves and dimension stabilizing resins can be expensive, the colored wood may not be impregnated with a dimension stabilizing resin.

Second Embodiment

Next, a method for producing colored wood according to the second embodiment will be described in detail based on the drawings.

As described above, by performing steam treatment at high-temperature and high-pressure using an organic acid aqueous solution, even thick wood can be colored in vivid colors and the dimensional stability can be also enhanced. By using the production method described above, not only thick colored wood but also a sliced veneer that is colored and has less cracking can be obtained.

Figure 2:
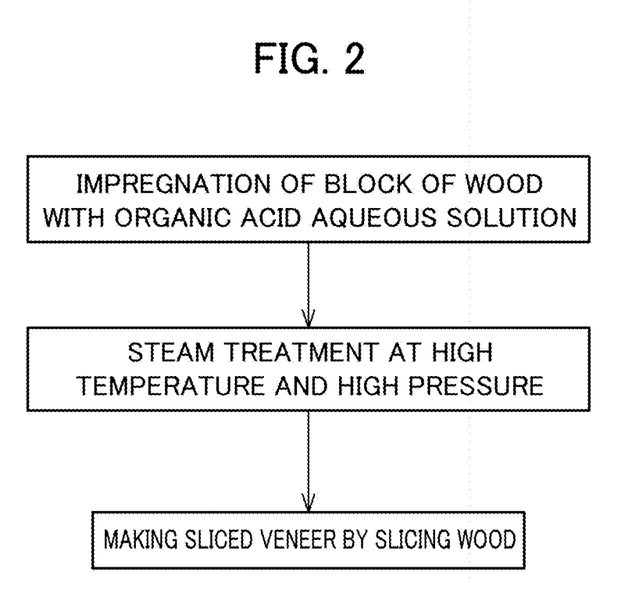
FIG. 2 is an explanatory diagram illustrating another example of the method for producing colored wood according to an embodiment.

FIG. 2 illustrates a flow of the method of producing a colored sliced veneer according to the present embodiment. In the production method according to the present embodiment, as a first step, a block of wood is impregnated with an organic acid aqueous solution containing an organic acid. Note that this step can be performed in the same manner as in the first embodiment, and an organic acid, wood, and a saccharide described above can also be used.

Next, as a second step, the wood in a wet state of being impregnated with the organic acid aqueous solution is subjected to steam treatment at high temperature and high pressure while being kept in the wet state. This can enhance the dimensional stability of the colored wood due to the organic acid while promoting the coloring of the wood. In addition, the dimensional stability can be further enhanced by impregnating a saccharide described above in the wood. Note that this step can be performed in the same manner as in the first embodiment.

Then, as a third step, a sliced veneer is obtained by slicing the block of wood that has been treated with steam. Note that the block of wood is preferably in a wet state when sliced. When the wood is in a wet state, cutting resistance can be reduced.

The method of slicing wood is not particularly limited and may be performed using, for example, a slicer or rotary lathe. The slicer may be either a vertical slicer or a horizontal slicer. In this specification, "slice" excludes the method of cutting wood using a saw. That is, when wood is cut using a saw, processing debris is generated and the yield in obtaining a veneer is reduced. However, when wood is cut using a slicer or rotary lathe, very little processing debris is generated and the yield in obtaining a sliced veneer can be increased.

The thickness of the sliced veneer obtained by slicing wood is not particularly limited and is preferably, for example, 0.1 to 3 mm, and more preferably 0.15 to 0.50 mm.

Here, the method for producing a colored sliced veneer according to the present embodiment may further include a laminated wood generation step to obtain laminated wood by butting and laminating multiple blocks of wood between the above-described steam treatment step and the slicing step.

Figure 3:
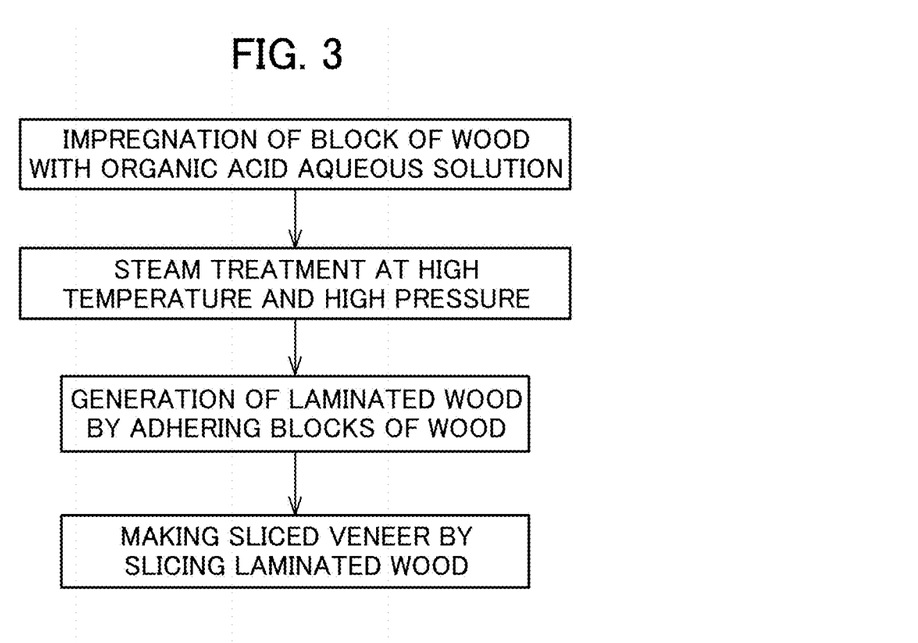
FIG. 3 is an explanatory diagram illustrating yet another example of the method for producing colored wood according to an embodiment.
Figure 4:
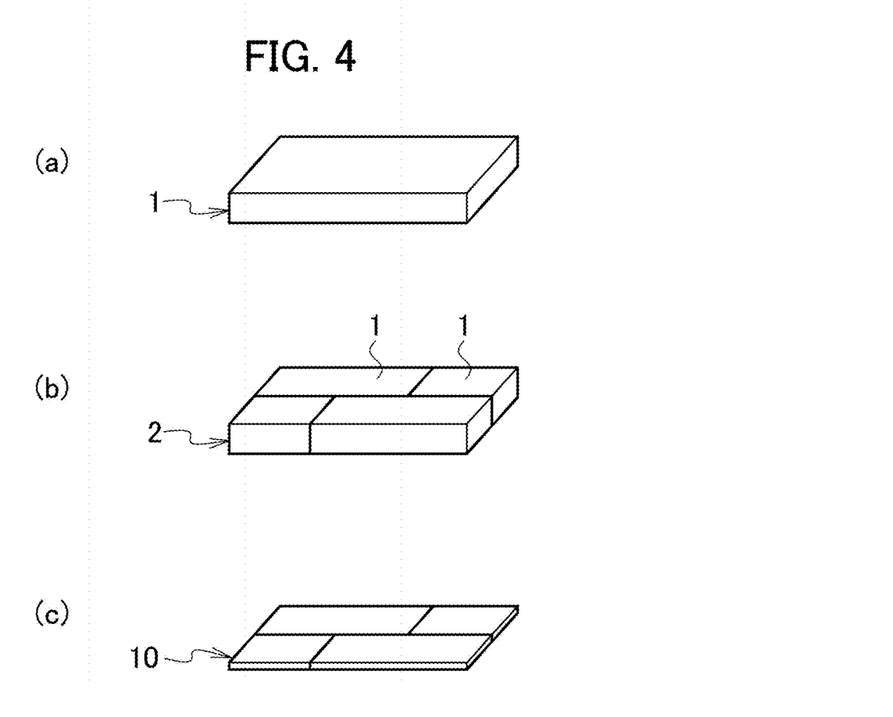
FIG. 4(a) is a schematic diagram illustrating a block of wood.
FIG. 4(b) is a schematic diagram illustrating laminated wood.
FIG. 4(c) is a schematic diagram illustrating a sliced veneer.

Specifically, as illustrated in FIGS. 3 and 4(*a*), a block of wood 1 is impregnated with an organic acid aqueous solution and then is subjected to steam treatment at high temperature and high pressure. Then, as illustrated in FIG. 4(*b*), multiple blocks of wood 1 that have been subjected to steam treatment are laminated and adhered to produce laminated wood 2. Note that in the laminated wood 2 illustrated in FIG.

4(b), blocks of wood 1 are butted together in two rows along the veneer width direction, and then blocks of wood 1 in each row are shifted in the longitudinal direction so that they have randomly arranged joints when viewed in the veneer thickness direction.

The adhesive for laminating blocks of wood 1 is not particularly limited, and a water-based adhesive including a water-based vinyl urethane resin-based adhesive, a vinyl acetate resin-based adhesive, and a water-based isocyanate resin-based adhesive can be used.

Then, as illustrated in FIG. 4(c), a sliced veneer 10 can be obtained by slicing the laminated wood 2 made of multiple blocks of wood 1. The method for slicing the laminated wood 2 is not particularly limited and can be performed as described above, for example, using a slicer.

A sliced veneer obtained as described above is adhered to a base material and is used as a surface decorative material for various products. Note that there are two methods of adhering a sliced veneer to a base material, one is to dry the sliced veneer once and then attach it with an adhesive, and the other is to attach the sliced veneer with an adhesive while it is in a wet state. In the case of a veneer of laminated wood as illustrated in FIG. 4(c), it is common to attach the veneer with an adhesive while it is in a wet state because the laminated layer may break due to drying.

Here, since materials deteriorate due to steam treatment, as the steam treatment progresses, that is, as the wood becomes darker, the amount of shrinkage during drying increases, and cracking and the like are more likely to occur in the wood. Thus, when a sliced veneer obtained from the wood that has been subjected to steam treatment without being impregnated with an organic acid and a saccharide is adhered to a base material in a wet state, veneer cracking is likely to occur, and a phenomenon such as warpage occurs after adhering. In particular, the thicker the sliced veneer, the more difficult it is to suppress cracking and the more warpage occurs. However, in the present embodiment, the laminated wood 2 made of the wood 1 that has been impregnated with an organic acid is sliced to obtain the sliced veneer 10. Thus, cracking and warpage of the sliced veneer 10 are suppressed due to the dimensional stabilizing effect of the organic acids and saccharide when the sliced veneer 10 is attached to a base material. Therefore, the sliced veneer can be attached to a base material even when the sliced veneer is sliced from more darkened wood, which is conventionally difficult to attach to a base material due to the notable occurrence of cracking and warpage. The same effect can also be expected when a sliced veneer in a wet state is dried once and used.

The thickness of the sliced veneer 10 obtained by slicing the laminated wood 2 is not particularly limited and is preferably, for example, 0.1 to 3 mm, and more preferably 0.15 to 0.50 mm.

Thus, the method for producing colored wood according to the present embodiment includes a step of impregnating a block of wood with an organic acid aqueous solution containing an organic acid, and a step of performing steam treatment at high temperature and high pressure on the block of wood in a wet state of being impregnated with the organic acid aqueous solution while keeping the block of wood in the wet state. Also, the production method according to the present embodiment further includes a step of obtaining a sliced veneer by slicing the block of wood that has been subjected to steam treatment. The production method according to the present embodiment promotes hydrolysis of the composition components of wood due to the organic acid and steam treatment, and a vividly colored sliced veneer can be obtained. In addition, since organic acids have the effect of stabilizing the dimensions of wood, the occurrence of cracking, deformation, and shrinkage during drying of the veneer can be expected to be suppressed.

Third Embodiment

Next, a method for producing colored wood according to the third embodiment will be described in detail based on the drawings.

Depending on the environment in which wood is used, deterioration such as corrosion may occur. Such corrosion occurs mainly as a result of biological activities and is further promoted by environmental factors such as moisture and ultraviolet rays. Therefore, wood used in the field may be impregnated with a wood-preserving chemical to suppress corrosion. In contrast, chemical-less and non-chemical wood preservation methods are also attracting attention, and a typical treatment method is heat treatment.

Heat treatment to improve the decay resistance of wood includes denaturing wood components by treating wood at high temperatures under non-oxygen or superheated steam conditions. Known wood having improved decay resistance through such heat treatment includes ThermoWood, which has been subjected to heat treatment under superheated steam, S-TECH WOOD, which has been subjected to heat treatment under nitrogen gas, and Platowood, which is subjected to heat treatment under nitrogen gas after performing steaming treatment and then drying.

Here, Platowood is obtained by performing steaming treatment on it for 3 to 5 hours at 150 to 180° C. and a pressure of 10 bar (about 10 kg/cm$^2$), drying it to reduce the moisture content to about 10%, and heating it in a heating furnace at 150 to 190° C. for 14 to 16 hours. Note that heating in the heating furnace is performed under a nitrogen atmosphere. Such Platowood has been reported to be highly resistant to decay in decay resistance tests according to EU standards. In contrast, it is reported in Non-Patent Literature that no significant improvement in decay resistance has been confirmed as a result of evaluation according to JIS K1571. Thus, conventional heat treatment has room for further improvement to improve decay resistance.

Non-Patent Literature: Kensuke HANATA and two others, "Resistances of Plato heat-treated wood against decay and termite", Wood Preservation, Japan Wood Protection Association, 2006, Vol. 32, No. 1, p. 13-19.

The method for producing colored wood according to the present invention is characterized by further enhancing decay resistance of colored wood that has been colored in vivid colors and has improved dimensional stability.

Figure 5:
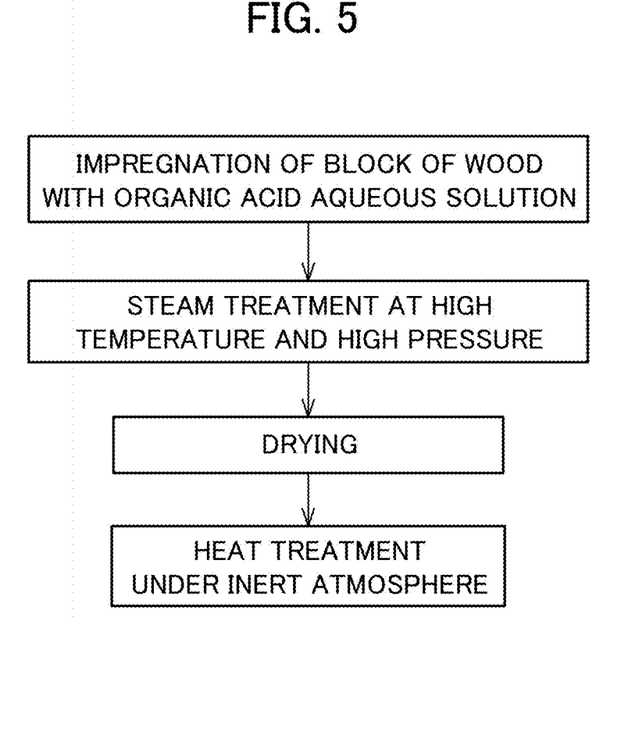
FIG. 5 is an explanatory diagram illustrating still yet another example of the method for producing colored wood according to an embodiment.

FIG. 5 illustrates a flow of the method for producing colored wood having improved decay resistance according to the present invention. In the production method according to the present invention, as a first step, a block of wood is impregnated with an organic acid aqueous solution containing an organic acid. Note that the step can be performed in the same manner as in the first embodiment, and an organic acid, wood, and a saccharide described above can also be used.

Next, as a second step, the wood in the wet state being impregnated with the organic acid aqueous solution is subjected to steam treatment at high temperature and high pressure while being kept in the wet state. This can promote the coloring of wood. In addition, by impregnating an organic acid and a saccharide described above in the wood, dimensional stability in the drying step described below can be enhanced and cracking of the wood during drying can be suppressed. Note that this step can also be performed in the same manner as in the first embodiment.

Then, in a third step, the wood that has been subjected to steam treatment is dried to remove excess moisture inside the wood. This step can be performed in the same manner as in the first embodiment. By going through this drying step, colored wood can be obtained.

Then, as a fourth step, the wood that has been subjected to steam treatment and dry treatment is heated under an inert atmosphere. By performing heat treatment on the wood under an inert atmosphere, an amorphous region, which tends to be the originating point of wood decay, can be decomposed.

The conditions for heat treatment under an inert atmosphere are preferably capable of causing an amorphous region of wood to be decomposed. More specifically, it is preferable to heat under an inert atmosphere at 140° C. or more and 220° C. or less. The heating time is preferably adjusted according to the type and size of wood, and may be 12 to 72 hours, for example. The inert atmosphere is an atmosphere having a reduced oxygen concentration and can be a nitrogen gas atmosphere or a superheated steam atmosphere, for example. Note that superheated steam is a gas obtained by heating saturated steam and thus is a gas containing little oxygen.

Due to the heating step in such an inert atmosphere, an amorphous region, which is the originating point of wood decay, decomposes and decreases. Thus, it becomes possible to enhance the decay resistance without using any wood preservative to suppress corrosion. Furthermore, in the production method according to the present embodiment, heat treatment is performed on the wood containing an organic acid under an inert atmosphere. The organic acid can not only promote the coloration of wood but also promote the decomposition of the amorphous region of the wood, and thus it becomes possible to proceed the decomposition of the amorphous region at low temperature.

Here, when wood is subjected to heat treatment, a decomposition reaction occurs due to high-temperature treatment, and thus there is usually a possibility of shrinkage in the volume. However, in the method for producing colored wood according to the present embodiment, wood is impregnated with an organic acid that has a dimensional stabilizing effect, and thus it can be expected to suppress the shrinkage of the wood even when it is subjected to heat treatment under an inert atmosphere. Furthermore, the heat-treated wood generally results in a material having a reduced viscosity. This is because the amorphous region that makes the wood viscous, that is, the place where water is easily absorbed, is decomposed. However, the colored wood according to the present embodiment is impregnated with at least an organic acid and may also be impregnated with a saccharide. Such an organic acid and a saccharide penetrate between fibers of cellulose and also have the effect of imparting flexibility to the wood. Therefore, the colored wood according to the present embodiment can be expected to maintain viscosity compared to general heat-treated wood.

As described above, the method for producing colored wood according to the present embodiment includes a step of impregnating a block of wood with an organic acid aqueous solution containing an organic acid, and a step of performing steam treatment at high temperature and high pressure on the block of wood in a wet state of being impregnated with the organic acid aqueous solution while keeping the block of wood in the wet state. The production method further includes a step of drying the block of wood that has been subjected to steam treatment, and a step of, after drying the block of wood that has been subjected to steam treatment, heating it under an inert atmosphere. The temperature in the steam treatment is 110° C. or more and 160° C. or less, and the pressure is the saturated steam pressure at this temperature.

In the production method according to the present embodiment, hydrolysis of the composition components of wood is promoted due to the organic acid and the steam treatment, and the wood can be darkened to a vivid color. Furthermore, in the production method according to the present embodiment, an amorphous region, which is the originating point of decay, is decomposed and reduced through heat treatment in an inert atmosphere, and thus the decay resistance of the colored wood can be enhanced.

In the method for producing colored wood according to the present embodiment, the inert atmosphere is preferably a nitrogen atmosphere or a superheated steam atmosphere.

Note that the colored wood according to the present embodiment is darkened to a vivid color and is highly resistant to decay, and thus it can be used for exterior applications, such as exterior materials and wood decks.

EXAMPLES

The method for producing colored wood according to the embodiments will be described in more detail below with examples and comparative examples, but the embodiments are not limited to these examples.

Example 1

(Preparation of Test Samples)

First, four sheets of dried wood (KD wood) of yellow birch having a width of 100 mm, a length of 300 mm, and a thickness of 28 mm were prepared as wood. Note that the wood was obtained by quartering KD wood of yellow birch having a width of 100 mm, a length of 1200 mm, and a thickness of 28 mm.

Next, aqueous solutions of example 1-1, example 1-2, and comparative example 1-2 were prepared by mixing succinic acid, which is an organic acid, maltose, which is a saccharide, and water in the proportions illustrated in Table 1. Note that the aqueous solution of example 1-2 is an aqueous solution containing a total of 20% by mass of the organic acid and the saccharide. In comparative example 1-1, no organic acid and no saccharide were used and only water was used.

TABLE 1

| | Example 1-1 | Example 1-2 | Comparative example 1-1 | Comparative example 1-2 |
|---|---|---|---|---|
| Impregnation with organic acid | Yes | Yes | No | No |
| Type of organic acid | Succinic acid | Succinic acid | — | — |
| Concentration of organic acid | 10% by mass | 10% by mass | — | — |
| Impregnation with saccharide | No | Yes | No | Yes |
| Type of saccharide | — | Maltose | — | Maltose |
| Concentration of saccharide | — | 10% by mass | — | 10% by mass |

Then, the aqueous solutions of example 1-1, example 1-2, and comparative example 1-2, and the water of comparative example 1-1 were placed in pressure-resistant containers, and the above-described yellow birch KD wood was immersed one by one. Then, with the yellow birch KD wood immersed in the aqueous solutions, pressure impregnation treatment was performed in which the atmospheric pressure was maintained at 0.3 MPa for 1 hour.

Then, each yellow birch wood that had been subjected to impregnation treatment was taken out from the aqueous solutions, and steam treatment was performed using pressure-resistant containers. Note that the steam treatment was performed while the yellow birch wood was kept in a wet state. In the steam treatment, the temperature was 140° C., the pressure was the saturated steam pressure at this temperature, and the time was 90 minutes.

Each yellow birch wood that had been subjected to steam treatment was naturally dried for four days and then dried at 50° C. for another 24 hours to obtain test samples of example 1-1, example 1-2, comparative example 1-1, and comparative example 1-2.

(Evaluation)

For each test sample of example 1-1, example 1-2, comparative example 1-1, and comparative example 1-2 obtained as described above, the proportion of dimensional change and the surface color were measured.

<Measurement of Dimensional Change Proportion>

For each test sample, the width dimension of the yellow birch KD wood before impregnation with an aqueous solution and the width dimension of the sample after steam treatment and drying were measured. Then, the proportion of dimensional change of each test sample was obtained from the following equation 1. The proportion of dimensional change of each test sample is illustrated in Table 2.

[Math. 1]

$$\text{Proportion of dimensional change (\%)} = [(\text{width dimension before aqueous solution impregnation}) - (\text{width dimension after drying})] / [\text{width dimension before aqueous solution impregnation}] \times 100 \quad (1)$$

<Colorimetry>

A colorimeter was used to measure the lightness L* of the surface of each test sample, and the chromaticity a* and b*, which indicate hue and saturation. Note that the lightness L* and chromaticity a* and b* were the average values obtained by measuring three dark parts (heartwood) and three light parts (sapwood) of each test sample. The measurement results of the lightness L* and chromaticity a* and b* on the surface of each test sample are illustrated in Table 2.

As illustrated in Table 2, the test sample of example 1-1 has almost the same dimensional change proportion as the test sample of comparative example 1-1, but has reduced lightness L*. Here, it is known that when wood is darkened through heat treatment, the surface of wood has reduced lightness L*. Thus, it is evident that even under the same steam treatment condition, thermal coloration is promoted in example 1-1 using the organic acid. In addition, even though thermal coloration due to the organic acid is promoted in example 1-1, each of the test samples in example 1-1 and comparative example 1-1 exhibits a similar degree of dimensional change. Therefore, it is thought that the dimensional stabilizing effect of wood is also produced by the organic acid.

Here, as illustrated in Table 2, the test sample of example 1-2 exhibits a better dimensional change proportion than that of comparative example 1-1. This is the dimensional stabilization effect due to impregnation of a saccharide. The test sample of example 1-2 is made darker than the test samples of comparative example 1-1 and comparative example 1-2. It is evident that the use of an aqueous solution containing both an organic acid and a saccharide promotes the thermal coloration of wood and further improves its dimensional stability.

Example 2

First, as in example 1, multiple sheets of dried wood (KD wood) of yellow birch having a width of 75 mm, a length of 300 mm, and a thickness of 28 mm were prepared. Furthermore, multiple sheets of green wood of yellow birch having a width of 75 mm, a length of 300 mm, and a thickness of 28 mm were prepared.

Next, aqueous solutions of example 2-1 and example 2-2 were prepared by mixing citric acid, which is an organic acid, sucrose, which is a saccharide, and water in the proportions illustrated in Table 3. These aqueous solutions contain a total of 20% by mass of the organic acid and the saccharide. In comparative example 2-1 and comparative example 2-2, the organic acid and the saccharide were not used and only water was used.

TABLE 2

|  |  | Example 1-1 | Example 1-2 | Comparative example 1-1 | Comparative example 1-2 |
|---|---|---|---|---|---|
| Proportion of dimensional change | | 5.2% | 1.1% | 4.9% | 1.3% |
| Colorimetry | L* | 42.4 | 44.4 | 46.7 | 49.0 |
|  | a* | 13.5 | 12.8 | 12.8 | 11.4 |
|  | b* | 20.2 | 20.8 | 23.6 | 23.7 |

TABLE 3

|  | Example 2-1 | Example 2-2 | Comparative example 2-1 | Comparative example 2-2 | Reference example |
|---|---|---|---|---|---|
| Wood used | KD wood | KD wood | KD wood | KD wood | Raw wood |
| Impregnation with organic acid | Yes | Yes | No | No | — |
| Type of organic acid | Citric acid | Citric acid | — | — | — |
| Concentration of organic acid | 10% by mass | 10% by mass | — | — | — |
| Impregnation with saccharide | Yes | Yes | No | No | — |
| Type of saccharide | Sucrose | Sucrose | — | — | — |

TABLE 3-continued

|  | Example 2-1 | Example 2-2 | Comparative example 2-1 | Comparative example 2-2 | Reference example |
|---|---|---|---|---|---|
| Concentration of saccharide | 10% by mass | 10% by mass | — | — | — |
| Steam treatment temperature | 120° C. | 130° C. | 130° C. | 140° C. | 140° C. |
| Steam treatment time | 75 min. | 75 min. | 75 min. | 75 min. | 75 min. |

Then, the aqueous solutions of example 2-1 and example 2-2 and the water of comparative example 2-1 and comparative example 2-2 were placed in pressure-resistant containers, and six sheets of yellow birch KD wood described above were immersed therein. Then, with the yellow birch KD wood immersed, pressure impregnation treatment was performed to maintain the atmospheric pressure at 0.3 MPa for 1 hour.

Then, each yellow birch wood that had been subjected to impregnation treatment was taken out from the aqueous solutions, and steam treatment was performed using pressure-resistant containers. Note that the steam treatment was performed while the yellow birch wood was kept in a wet state. In the steam treatment, temperatures were as illustrated in Table 3, pressures were the saturated steam pressure at these temperatures, and the time was 75 minutes. In addition, as a reference example, green wood of yellow birch was subjected to steam treatment using a pressure-resistant container. Note that in the steam treatment of green wood, the temperature was 140° C., the pressure was the saturated steam pressure at this temperature, and the time was 75 minutes.

Each yellow birch wood that had been subjected to steam treatment was dried in the following order: (1) a temperature of 50° C., a humidity of 95%, and 5 hours; (2) a temperature of 45° C., a humidity of 90%, and 118 hours; (3) a temperature of 45° C., a humidity of 79%, and 116 hours; (4) a temperature of 50° C., a humidity of 65%, and 240 hours.

Thus, each test sample of example 2-1, example 2-2, comparative example 2-1, comparative example 2-2 and reference example was obtained.

(Evaluation)

For each test sample of example 2-1, example 2-2, comparative example 2-1, and comparative example 2-2 obtained as described above, the proportion of dimensional change was measured in the same manner as in example 1. The proportion of dimensional change of each test sample is illustrated in Table 4.

TABLE 4

|  | Example 2-1 | Example 2-2 | Comparative example 2-1 | Comparative example 2-2 |
|---|---|---|---|---|
| A | 0.0% | 0.0% | 1.3% | 1.7% |
| B | 2.2% | 7.9% | 12.3% | 11.4% |
| C | 0.9% | 1.3% | 3.1% | 7.0% |
| D | 1.7% | 4.3% | 3.1% | 4.3% |
| E | 0.9% | 0.4% | 0.4% | 1.7% |
| F | −0.4% | 0.4% | 1.3% | 3.6% |

As for example 1, the surface lightness L* and the chromaticity a* and b* were measured for the test samples of example 2-1, example 2-2, comparative example 2-1, comparative example 2-2, and the reference example. The maximum value, minimum value, and average value of the lightness L* and the chromaticity a* and b* for each test sample are illustrated in Table 5.

TABLE 5

|  |  | Example 2-1 | Example 2-2 | Comparative example 2-1 | Comparative example 2-2 | Reference example |
|---|---|---|---|---|---|---|
| L* | Average | 55.5 | 48.5 | 58.8 | 52.7 | 59.4 |
|  | Maximum | 62.7 | 56.8 | 68.1 | 59.2 | 68.4 |
|  | Minimum | 44.7 | 33.6 | 44.1 | 45.4 | 48.0 |
| a* | Average | 14.4 | 15.1 | 10.7 | 11.0 | 13.4 |
|  | Maximum | 17.9 | 18.9 | 14.7 | 15.1 | 15.7 |
|  | Minimum | 11.9 | 12.4 | 7.3 | 9.0 | 8.9 |
| b* | Average | 25.8 | 26.5 | 24.7 | 25.0 | 20.3 |
|  | Maximum | 30.1 | 30.3 | 29.6 | 29.5 | 22.6 |
|  | Minimum | 21.0 | 20.6 | 20.8 | 22.2 | 16.3 |

From Table 4, the test samples of example 2-1 and example 2-2 exhibit a reduced proportion of dimensional change and better dimensional stability than the test samples of comparative example 2-1 and comparative example 2-2. This is considered to be the dimensional stabilization effect due to the impregnation of the organic acid and the saccharide as described above. Furthermore, when example 2-2 and comparative example 2-1 having the same steam treatment condition are compared, the test sample of example 2-2 has a lower lightness L* than that of comparative example 2-1. Therefore, it is evident that thermal coloration is promoted in example 2-2 using the organic acid.

Here, from Table 5, the lightness L* of example 2-1 is a value between that of comparative example 2-1 and that of comparative example 2-1. From Table 3, the steam treatment temperature of example 2-1 is 120° C. and this is 10 to 20° C. lower than 130° C. of comparative example 2-1 and 140° C. of comparative example 2-2. This is considered to be due to the fact that the wood was impregnated with the organic acid and thus denaturation of wood components, which is the cause of the darkening, occurred at a lower temperature. With such a lower temperature in steam treatment, fuel cost of steam treatment can be reduced, and the specifications of the equipment used for steam treatment can also be lowered.

In addition, not only temperature but also time is an important factor in the darkening of wood in thermal coloring. For example, by shortening the time at the same treatment temperature (130° C.) as in example 2-2, the same degree of darkening as in comparative example 2-1 and comparative example 2-2 can be realized. Thus, using the organic acid can also shorten the time of steam treatment.

Here, the test sample in the reference example is green wood of yellow birch wood that has not been dried and has been subjected to steam treatment. The colorimetric result for the test sample in the reference example is also illustrated in Table 5. As illustrated in Table 5, it is evident that the a* values of the test samples in comparative example 2-1 and comparative example 2-2 are lower than that of the test sample in the reference example. Thus, as in comparative example 2-1 and comparative example 2-2, when drying was performed once and then water was impregnated and steam treatment was performed, the obtained wood was evaluated as "dull color" or "lack of vividness" compared with steam-treated products of green wood.

In contrast, the a* values of the test samples of examples 2-1 and 2-2 using KD wood are comparable to or better than that of the reference sample using green wood. Combined with the result of example 1 above, this is considered to be the effect of impregnation with the organic acid.

Example 3

(Preparation of Test Samples)

First, dried wood of yellow birch, which was a wood product in which the front and back sides had red and white tones respectively and the width was 150 mm, was cut, and several sheets of yellow birch KD wood having a width of 75 mm, a length of 150 mm, and a thickness of 28 mm were prepared. Next, citric acid, malic acid, and succinic acid were prepared as organic acids, and fructose (a six-carbon saccharide), maltose (a disaccharide of glucose which is a six-carbon saccharide), and xylose (a five-carbon saccharide) were prepared as saccharides.

Figure 6:
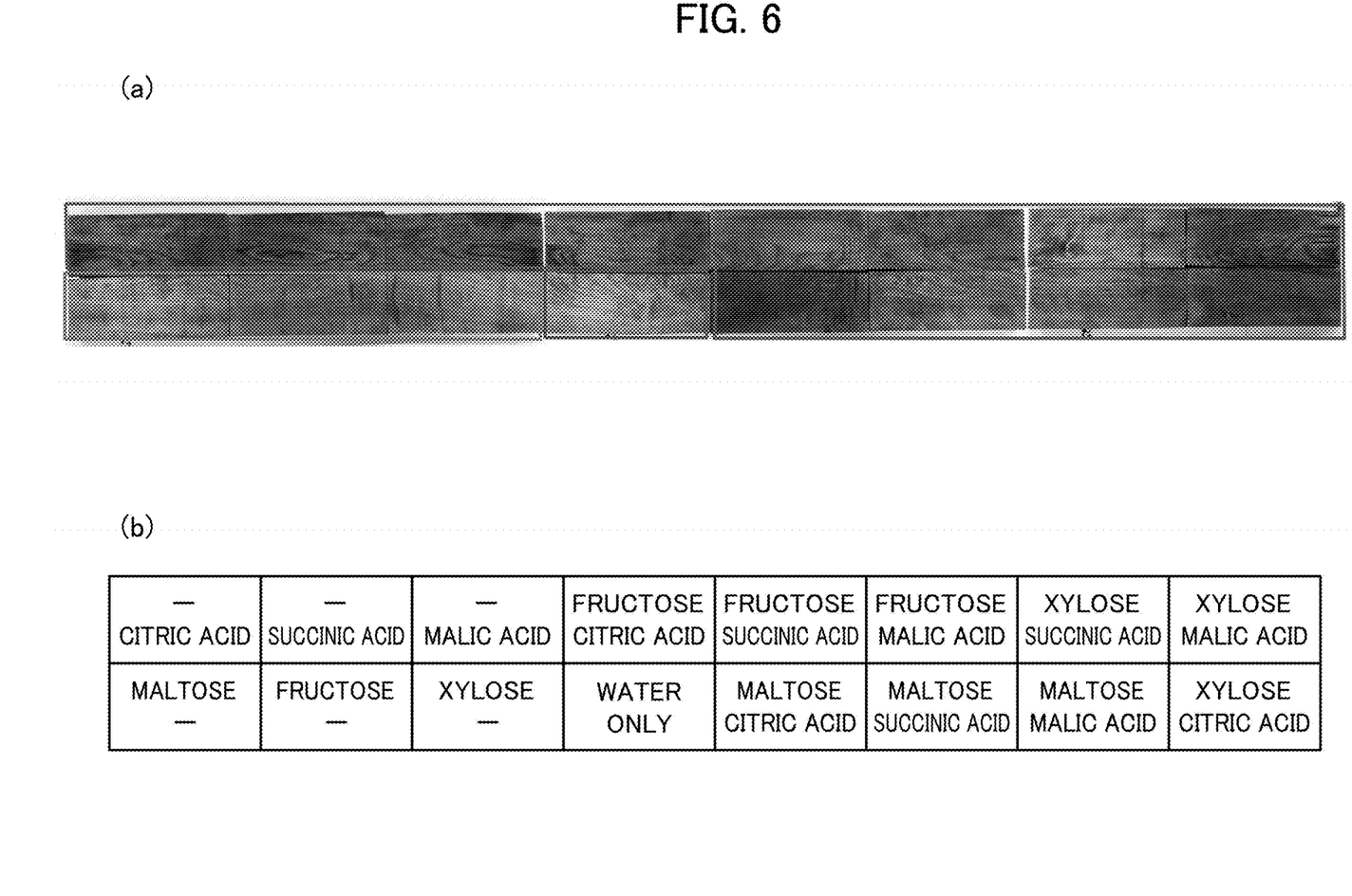
FIG. 6(a) is a photograph illustrating the result of observing surfaces of wood obtained after coloring treatment in example 3.
FIG. 6(b) is a diagram illustrating compositions of aqueous solutions impregnated into each piece of wood in example 3.

The aqueous solutions were then prepared by adding organic acids and saccharides illustrated in FIG. 6(b) to water and mixing them. Note that the concentrations of the organic acids and saccharides in these aqueous solutions are 10% by mass for each of citric acid, succinic acid, fructose, maltose, and xylose, and 5% by mass for malic acid only. That is, the leftmost aqueous solution in the upper row of FIG. 6(b) is an organic acid aqueous solution containing only 10% by mass of citric acid, and the rightmost aqueous solution in the upper row is an organic acid aqueous solution containing 10% by mass of xylose and 5% by mass of malic acid. Note that the fourth from the left in the lower row of FIG. 6(b) indicates only water not containing an organic acid and a saccharide.

Then, each of the aqueous solutions illustrated in FIG. 6(b) was placed in a pressure-resistant container, and the above-described yellow birch KD wood was immersed therein. Then, with the yellow birch KD wood immersed, pressure impregnation treatment was performed in which the atmospheric pressure was kept at 8 MPa for 4 hours.

Then, each yellow birch wood that had been subjected to impregnation treatment was taken out of the aqueous solutions, and steam treatment was performed using a pressure-resistant container. Note that the steam treatment was performed while the yellow birch wood was kept in a wet state. In the steam treatment, the temperature was 140° C., the pressure was the saturated steam pressure at this temperature, and the time was 90 minutes.

Each yellow birch wood that had been subjected to steam treatment was dried naturally for 4 days and then dried at 50° C. for 24 hours to obtain each of the test samples using the aqueous solutions in FIG. 6(b).

(Evaluation)

For each of the test samples obtained as described above, conditions of the surfaces and cut ends were visually observed. Specifically, the surfaces and cut ends of each of the test samples were processed with a planer and then oil was applied thereto. Then, the surfaces and cut ends of each of the test samples were visually observed.

FIG. 6(a) illustrates the results of observing the surfaces of the test samples that have been subjected to coloring treatment using the respective aqueous solutions in FIG. 6(b). Specifically, the wood at the left end of the upper row in FIG. 6(a) illustrates the result of observing the surface of the test sample using the aqueous solution at the left end of the upper row in FIG. 6(b) (organic acid aqueous solution containing only citric acid). As illustrated in FIG. 6(a), compared with the blank test sample impregnated only with water (fourth from left in the lower row), it is evident that test samples impregnated with aqueous solutions containing only organic acids and those impregnated with aqueous solutions containing organic acids and saccharides have a dark color and are reddish as a whole. In contrast, test samples impregnated with aqueous solutions containing only saccharides had almost the same color as the blank test sample, and no difference in coloring could be observed. Therefore, by impregnating KD wood with an organic acid and performing steam treatment, it is evident that dark coloring can be achieved at low temperatures and in a short time.

Figure 7:
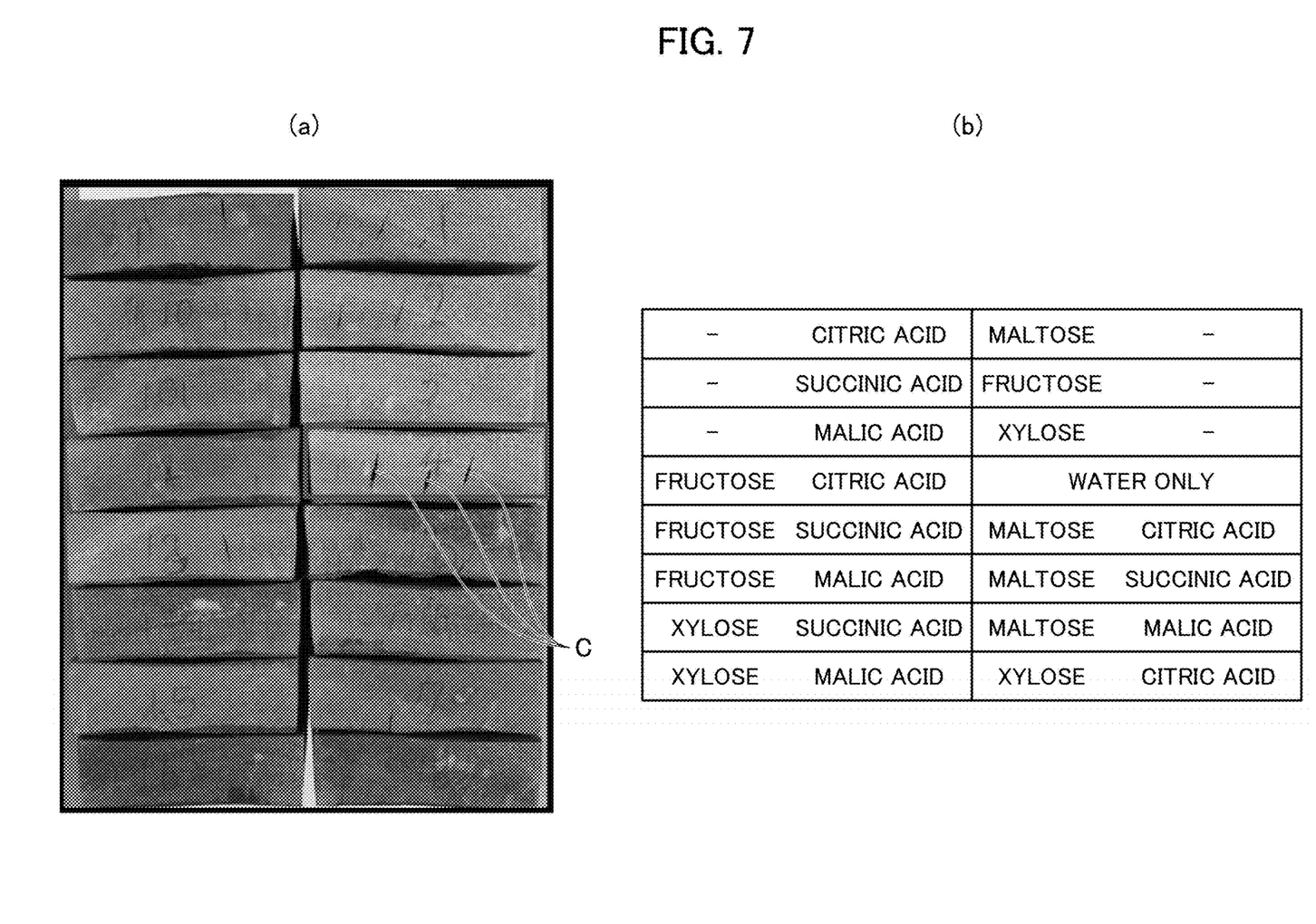
FIG. 7(a) is a photograph illustrating the result of observing cut ends of wood after performing coloring treatment in example 3.
FIG. 7(b) is a diagram illustrating compositions of aqueous solutions impregnated into each piece of wood in example 3.

Next, for each of the test samples obtained as described above, the color of cut ends and the state of cracking were visually observed. FIG. 7(a) illustrates the results of observing cut ends of the test samples that have been subjected to coloring treatment using the respective aqueous solutions in FIG. 7(b). FIG. 7(b) illustrates compositions of the aqueous solutions impregnated into the respective test samples, as in FIG. 6(b).

As illustrated in FIG. 7(a), compared with the blank test sample impregnated only with water (fourth from the top of the right row), it is evident that test samples impregnated with aqueous solutions containing only organic acids and those impregnated with aqueous solutions containing organic acids and saccharides have dark color and are reddish. In contrast, it is evident that test samples impregnated with aqueous solutions containing only saccharides have almost the same color as the blank test sample.

In addition, in the test sample impregnated with only water, at least three large cracks C occurred, and multiple fine cracks are also confirmed. In contrast, it is evident that test samples impregnated with aqueous solutions containing only organic acids, those impregnated with aqueous solutions containing only saccharides, and those impregnated with aqueous solutions containing organic acids and saccharides have reduced occurrence of cracking compared with the blank test sample. Thus, it is evident that by impregnating KD wood with an organic acid and/or a saccharide and performing steam treatment can suppress dimensional shrinkage.

From the above results, it is evident that by impregnating KD wood with an organic acid and performing steam treatment, dimensional shrinkage can be suppressed while color darkening can be achieved at low temperature and in a short time. It is also evident that by impregnating KD wood with an organic acid and a saccharide and performing steam treatment, dimensional shrinkage can be further suppressed while color darkening can be achieved at low temperature and in a short time. This effect can be obtained not only in KD wood but also in the steam treatment of green wood. Note that since there are a variety of organic acids and saccharides that can be impregnated into wood, the color change during heat treatment that depends on combinations thereof and applicable types of wood may be grasped for applications.

Example 4

(Preparation of Test Samples)

First, dried wood (KD wood) of yellow birch wood having a width of 100 mm, a length of 300 mm, and a thickness of 28 mm was prepared as in example 1. Next, impregnation with an organic acid and a saccharide, steam treatment, and drying were performed in the same steps as in example 2-1. Then, the dried wood was subjected to heat treatment at 170° C. for 24 hours in a pressure-resistant container under a nitrogen gas atmosphere. Thus, the test sample of example 4-1 was obtained.

Green wood of yellow birch having a width of 100 mm, a length of 300 mm, and a thickness of 28 mm was prepared. Next, steam treatment and drying were performed in the same steps as in the reference example of example 2. Then, the dried wood was subjected to heat treatment at 170° C. for 24 hours under a nitrogen gas atmosphere using a pressure-resistant container. Thus, a test sample of comparative example 4-1 was obtained. Note that comparative example 4-1 is a sample treated in a similar manner to Platowood. Table 6 summarizes the wood used, impregnation conditions of an organic acid and a saccharide, steam treatment conditions, and heat treatment conditions under a nitrogen gas atmosphere.

TABLE 6

|  | Example 4-1 | Comparative example 4-1 |
| --- | --- | --- |
| Wood used | KD wood | Raw wood |
| Impregnation with organic acid | Yes | No |
| Type of organic acid | Citric acid | — |
| Concentration of organic acid | 10% by mass | — |
| Impregnation with saccharide | Yes | No |
| Type of saccharide | Sucrose | — |
| Concentration of saccharide | 10% by mass | — |
| Steam treatment temperature | 120° C. | 140° C. |
| Steam treatment time | 75 min. | 75 min. |
| Inert gas | Nitrogen | Nitrogen |
| Inert atmosphere treatment temperature | 170° C. | 200° C. |
| Inert atmosphere treatment time | 24 hr. | 24 hr. |

(Evaluation)

The test samples (specimens) of example 4-1 and comparative example 4-1 were evaluated for decay resistance in accordance with JIS K1571:2010 (Wood preservatives—performance requirements and their test methods for determining effectiveness), "5.2 Antiseptic Performance", "5.2.1 Laboratory Test", and "5.2.1.1 For Injection Treatment". Note that a weather-proofing operation was not performed and an antibacterial operation and a correction operation were performed. In addition, the same evaluation was performed on cedar sapwood as a control specimen.

The mass reduction ratio was then calculated from the mass of the specimen before and after the antibacterial operation or correction operation based on equations 2 and 3.

[Math. 2]

$$\text{Mass reduction ratio (\%) due to antibacterial operation} = [(\text{mass before antibacterial operation} - \text{mass after antibacterial operation})/(\text{mass before antibacterial operation})] \times 100 \quad (2)$$

$$\text{Mass reduction ratio (\%) due to correction operation} = [(\text{mass before correction operation} - \text{mass after correction operation})/(\text{mass before correction operation})] \times 100 \quad (3)$$

Note that the mass reduction ratio after correction of the heat-treated specimens (the test samples of example 4-1 and comparative example 4-1) was calculated by subtracting the average mass reduction ratio of the correction operation specimens from the mass reduction ratio of the antibacterial operation specimens. The evaluation results are summarized in Table 7.

TABLE 7

|  |  | Mass reduction ratio (%) | |
| --- | --- | --- | --- |
|  | Test fungus | Average | Standard deviation |
| Comparative example 4-1 | Fomitopsis palustris | 57 | 5 |
|  | Trametes versicolor | 7 | 9 |
| Example 4-1 | Fomitopsis palustris | 9 | 4 |
|  | Trametes versicolor | 1 | 1 |
| Control specimen (cedar sapwood) | Fomitopsis palustris | 64 | 3 |
|  | Trametes versicolor | 36 | 9 |

As illustrated in Table 7, when the test fungus was Fomitopsis palustris, the mass reduction ratio of the test sample in example 4-1 was 9%, while that of the test sample in comparative example 4-1 was 57%, and that of the control specimen was 64%. When the test fungus was Trametes versicolor, the mass reduction ratio of the test sample in example 4-1 was 1%, while that of the test sample in comparative example 4-1 was 7%, and that of the control specimen was 36%.

Thus, it is evident that the test sample in example 4-1 has a significantly reduced mass reduction ratio compared with that of the test sample in comparative example 4-1, indicating that the decay resistance is greatly improved. Furthermore, as illustrated in Table 6, although the treatment temperature in an inert atmosphere in example 4-1 was 30° C. lower than that in comparative example 4-1, the decay resistance was improved, and thus it is thought that the decomposition of the amorphous region of wood was accelerated by the organic acid.

Note that according to JIS K1571, when the mass reduction ratio is 3% or less for both Fomitopsis palustris and Trametes versicolor, the material meets criteria for antiseptic performance and is therefore recognized as having antiseptic performance. Although the test sample of example 4-1 meets the criteria for Trametes versicolor, further investigation is required to meet the criteria for Fomitopsis palustris. However, compared with the test sample of comparative example 4-1, which was treated in a similar manner to Platowood, the test sample of example 4-1 is more antiseptic, and thus it is thought that the colored wood according to the present embodiment is more resistant to decay than Platowood.

Although the embodiments have been described above, the embodiments are not limited to these descriptions, and various modifications are possible within the scope of the gist of the embodiments.

The entire contents of Japanese Patent Application No. 2021-010556 (filed on Jan. 26, 2021) are incorporated herein by reference.

INDUSTRIAL APPLICABILITY

The present disclosure is capable of providing a method for producing colored wood that is capable of reducing cracking of wood during coloring while coloring is done more vividly than in a dry treatment, and is further capable of relaxing the coloring treatment conditions.

REFERENCE SIGNS LIST

1 Block of wood
2 Laminated wood
10 Sliced veneer

The invention claimed is:

1. A method for producing colored wood, the method comprising:
   impregnating a block of wood with an organic acid aqueous solution containing an organic acid, wherein the wood is artificially dried wood, a moisture content of the artificially dried wood is 7% to 25%, and the moisture content of the wood is measured in accordance with the Japanese Industrial Standard JIS Z2101; and
   performing steam treatment at a temperature and a pressure on the block of wood in a wet state of being impregnated with the organic acid aqueous solution while keeping the block of wood in the wet state,
   wherein, in the steam treatment, the temperature is 110° C. or more and 160° C. or less and the pressure is a saturated steam pressure at the temperature, and
   wherein a thickness of the wood is 10 mm or more and 40 mm or less.

2. The method for producing colored wood according to claim 1, wherein the organic acid aqueous solution further contains a saccharide.

3. The method for producing colored wood according to claim 2, wherein the saccharide is at least one selected from the group consisting of fructose, maltose, xylose, and sucrose.

4. The method for producing colored wood according to claim 2, wherein in the organic acid aqueous solution, an amount of the saccharide is 3% to 30% by mass.

5. The method for producing colored wood according to claim 1, wherein the organic acid is a divalent or higher carboxylic acid.

6. The method for producing colored wood according to claim 5, wherein the carboxylic acid is at least one selected from the group consisting of citric acid, malic acid, and succinic acid.

7. The method for producing colored wood according to claim 1, wherein in the organic acid aqueous solution, an amount of the organic acid is 3% to 30% by mass.

8. The method for producing colored wood according to claim 1, the method further comprising:
   drying the block of wood that has been subjected to the steam treatment.

9. The method for producing colored wood according to claim 1, the method further comprising:
   obtaining a sliced veneer by slicing the block of wood that has been subjected to the steam treatment.

10. The method for producing colored wood according to claim 8, the method further comprising:
    after drying the block of wood that has been subjected to the steam treatment, heating the block of wood under an inert atmosphere.

11. The method for producing colored wood according to claim 10, wherein the inert atmosphere is a nitrogen atmosphere or a superheated steam atmosphere.

* * * * *